(12) United States Patent
Kraus

(10) Patent No.: US 10,674,674 B2
(45) Date of Patent: Jun. 9, 2020

(54) BALER WITH LOCKOUT VALVE

(71) Applicant: Deere & Company, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 596 days.

(21) Appl. No.: 15/292,002

(22) Filed: Oct. 12, 2016

(65) Prior Publication Data

US 2018/0098505 A1 Apr. 12, 2018

(51) Int. Cl.
| | | |
|---|---|---|
| *A01F 15/08* | (2006.01) | |
| *A01F 15/04* | (2006.01) | |
| *A01F 15/10* | (2006.01) | |

(52) U.S. Cl.
CPC .......... *A01F 15/0825* (2013.01); *A01F 15/04* (2013.01); *A01F 15/042* (2013.01); *A01F 15/101* (2013.01); *A01F 2015/102* (2013.01)

(58) Field of Classification Search
CPC .... A01F 15/101; A01F 15/0825; A01F 15/04; A01F 15/042; A01F 2015/102
USPC ................................ 100/179, 188 R, 269.19
See application file for complete search history.

(56) References Cited

U.S. PATENT DOCUMENTS

| | | | |
|---|---|---|---|
| 2,890,646 A | * | 6/1959 | Soteropulos ........ A01F 15/0825 100/43 |
| 4,168,659 A | | 9/1979 | Yatcilla et al. |
| 4,280,403 A | | 7/1981 | Alderson |
| 4,588,364 A | | 5/1986 | Schad |
| 4,624,180 A | | 11/1986 | Strosser |
| 4,627,341 A | | 12/1986 | Sudbrack et al. |

(Continued)

FOREIGN PATENT DOCUMENTS

| | | |
|---|---|---|
| DE | 3941092 | 12/1990 |
| DE | 19644574 | 4/1998 |

(Continued)

OTHER PUBLICATIONS

Accumulators, Hydraulics & Pneumatics, Jan. 1, 2012 (Year: 2012).*

(Continued)

*Primary Examiner* — Elaine Gort
*Assistant Examiner* — Christopher B Wehrly
(74) *Attorney, Agent, or Firm* — Michael Best & Friedrich LLP

(57) ABSTRACT

A baler including a frame, a feed system coupled to the frame, a baling chamber, a gearbox, a crank arm driven by the gearbox, a plunger at least partially positioned within and reciprocally movable with respect to the baling chamber, and a connecting rod extending between and coupled to both the crank arm and the plunger, where the connecting rod defines a connector length, and where the connecting rod defines a fluid volume therein. The baler also including a hydraulic system in operable communication with the connecting rod, a pump, a first feed line extending between and in fluid communication with the fluid volume of the connecting rod and the pump, and a lockout valve adjustable between a first configuration in which the fluid volume is in fluid communication with the pump, and a second configuration in which the fluid volume is not in fluid communication with the pump.

16 Claims, 12 Drawing Sheets

(56) References Cited

U.S. PATENT DOCUMENTS

| | | | |
|---|---|---|---|
| 4,756,244 A | 7/1988 | Strosser | |
| 4,999,987 A | 3/1991 | Eggenmueller | |
| 5,253,570 A | 10/1993 | Goeckner | |
| 6,101,932 A | 8/2000 | Wilkens | |
| 6,257,131 B1* | 7/2001 | Wilkens | A01F 15/0825 100/192 |
| 6,651,416 B2 | 11/2003 | Trelstad et al. | |
| 7,047,719 B2 | 5/2006 | Dubois | |
| 2003/0172817 A1 | 9/2003 | Durbin et al. | |
| 2005/0056165 A1* | 3/2005 | Roth | A01F 15/042 100/179 |
| 2006/0150832 A1 | 7/2006 | Miller | |
| 2008/0141873 A1 | 6/2008 | Gemgross et al. | |
| 2014/0090568 A1 | 4/2014 | Missotten et al. | |
| 2015/0027325 A1 | 1/2015 | Bonte et al. | |
| 2015/0342120 A1 | 12/2015 | O'Reilly | |
| 2016/0113206 A1 | 4/2016 | Kraus | |

FOREIGN PATENT DOCUMENTS

| | | |
|---|---|---|
| DE | 19913030 A1 | 9/2000 |
| EP | 0951988 A2 | 10/1999 |

OTHER PUBLICATIONS

EP17196005.7 Extended European Search Report dated Mar. 18, 2018 (7 pages).
EP17195778.0 Extended European Search Report dated Mar. 6, 2018 (6 pages).
EP17195942.2 Extended European Search Report dated Mar. 8, 2018 (7 pages).

* cited by examiner

BALER WITH LOCKOUT VALVE

BACKGROUND

The present disclosure relates to an agricultural baler having a compression system for forming bales of crop.

SUMMARY

Large square balers have been used for harvesting hay for many years. Their primary advantage over other types of balers is that they densify the crop into large rectangular-shaped bales that minimizes both shipping and storage costs. Currently, there is a desire to create bales with higher density, which requires higher plunger forces and thus higher loads on the elements of the drive train (i.e., the connecting rod, gearbox, crank arm, and the like). As such, current baler designs require increasingly more expensive components in the drive train to allow for such large plunger forces.

In one aspect, the disclosure provides a baler including a frame, a feed system coupled to the frame, a baling chamber, a gearbox, a crank arm driven by the gearbox, a plunger at least partially positioned within and reciprocally movable with respect to the baling chamber, and a connecting rod extending between and coupled to both the crank arm and the plunger, where the connecting rod defines a connector length, and where the connecting rod defines a fluid volume therein. The baler also includes a hydraulic system in operable communication with the connecting rod including a pump, a first feed line extending between and in fluid communication with the fluid volume of the connecting rod and the pump, and a lockout valve adjustable between a first configuration in which the fluid volume is in fluid communication with the pump, and a second configuration in which the fluid volume is not in fluid communication with the pump.

In another aspect, the disclosure provides a baler including a frame, a feed system coupled to the frame, a baling chamber, a gearbox, a crank arm driven by the gearbox, a plunger at least partially positioned within and reciprocally movable with respect to the baling chamber, and a connecting rod extending between and coupled to both the crank arm and the plunger, where the connecting rod defines a connector length, and where the connecting rod defines a fluid volume therein. The baler also includes a hydraulic system in fluid communication with the fluid volume, the hydraulic system having a hydraulic pump, and wherein the hydraulic system is adjustable between a first configuration, in which the hydraulic pump is fluidly isolated from the fluid volume of the connecting rod, and a second configuration, in which the hydraulic pump is in fluid communication with the fluid volume of the connecting rod.

In yet another aspect, the disclosure provides a baler including a frame, a feed system coupled to the frame, a baling chamber, a gearbox, a plunger at least partially positioned within and reciprocally movable with respect to the baling chamber, and a connecting rod extending between and coupled to both the crank arm and the plunger, where the connecting rod defines a connector length, and where the connecting rod further defines a first fluid volume and a second fluid volume therein. The baler also includes a hydraulic system in fluid communication with the first fluid volume and the second fluid volume of the connecting rod, the hydraulic system including a hydraulic pump, and where the hydraulic system is adjustable between an extension stage in which the hydraulic pump provides fluid to the first fluid volume of the connecting rod, a locked stage in which the hydraulic pump is fluidly isolated from at least one of the first fluid volume and the second fluid volume of the connecting rod, and a retraction stage in which the hydraulic pump provides fluid to the second fluid volume of the connecting rod.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

The disclosure relates to a baler, and more particularly to baler having one or more variable length connecting rods. More specifically, the variable length connecting rods permit the baler to achieve larger compression forces at the plunger face while limiting the forces experienced by the gearbox of the baler. As such, the disclosed baler is able to produce denser bales for a given gearbox design. Furthermore, the variable length connecting rods permit the baler to increase the plunger throw (described below) for a given crank arm dimension. Still further, the variable length connecting rods permit the baler to finely tune the reciprocating motion of the plunger, or plunger stroke, with respect to the baling chamber.

Figure 1:
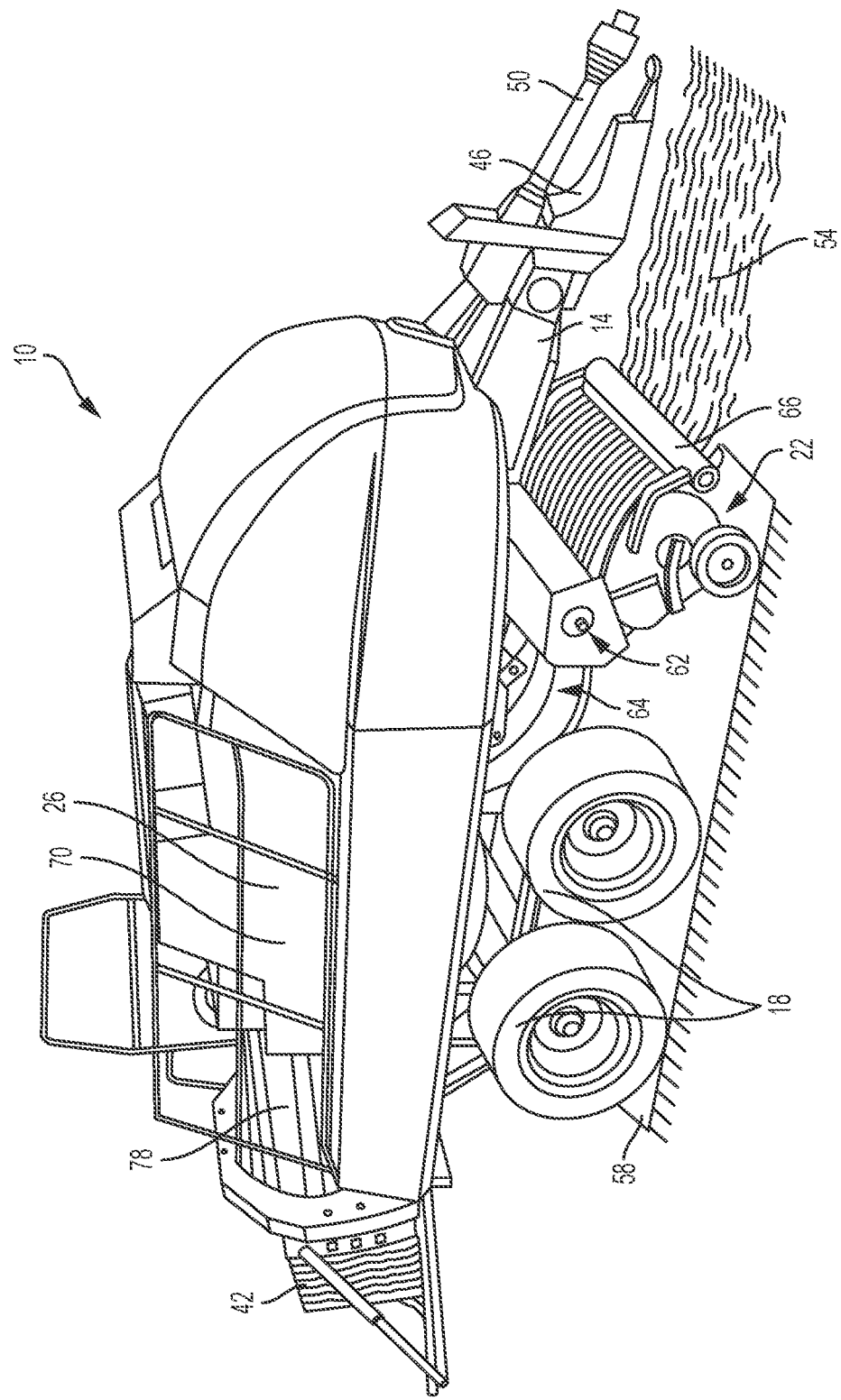
FIG. 1 is a perspective view of a machine, such as a baler, having a variable-length connector rod in accordance with one implementation of the present disclosure.

Referring to FIG. 1, a baler 10 includes a frame 14, a set of wheels 18 mounted on the frame 14, a feed system 22 coupled to the frame 14, a compression system 26 having a plunger assembly 82 (FIG. 2) to receive and compress crop material 54 provided by the feed system 22, and a controller 38 (FIGS. 2 and 5) to monitor and direct the baling operation. In the illustrated implementation, the baler 10 is a square baler for forming bales 42 of a crop, such as hay, straw, or other biomasses.

In the illustrated embodiment, the frame 14 of the baler 10 includes a tow bar 46 extending from the frame 14 and connectable to a towing vehicle (not shown), such as an agricultural tractor or other vehicle. The baler 10 also includes a power takeoff shaft 50 connectable to the towing vehicle to transmit a rotating drive force from the towing vehicle to various components of the baler 10. In other implementations, the baler 10 may have a dedicated power supply and/or prime mover (not shown), such as an engine, motor, battery, fuel cell, etc., for driving the wheels 18 and for driving and/or powering the various components of the baler 10.

Figure 2:
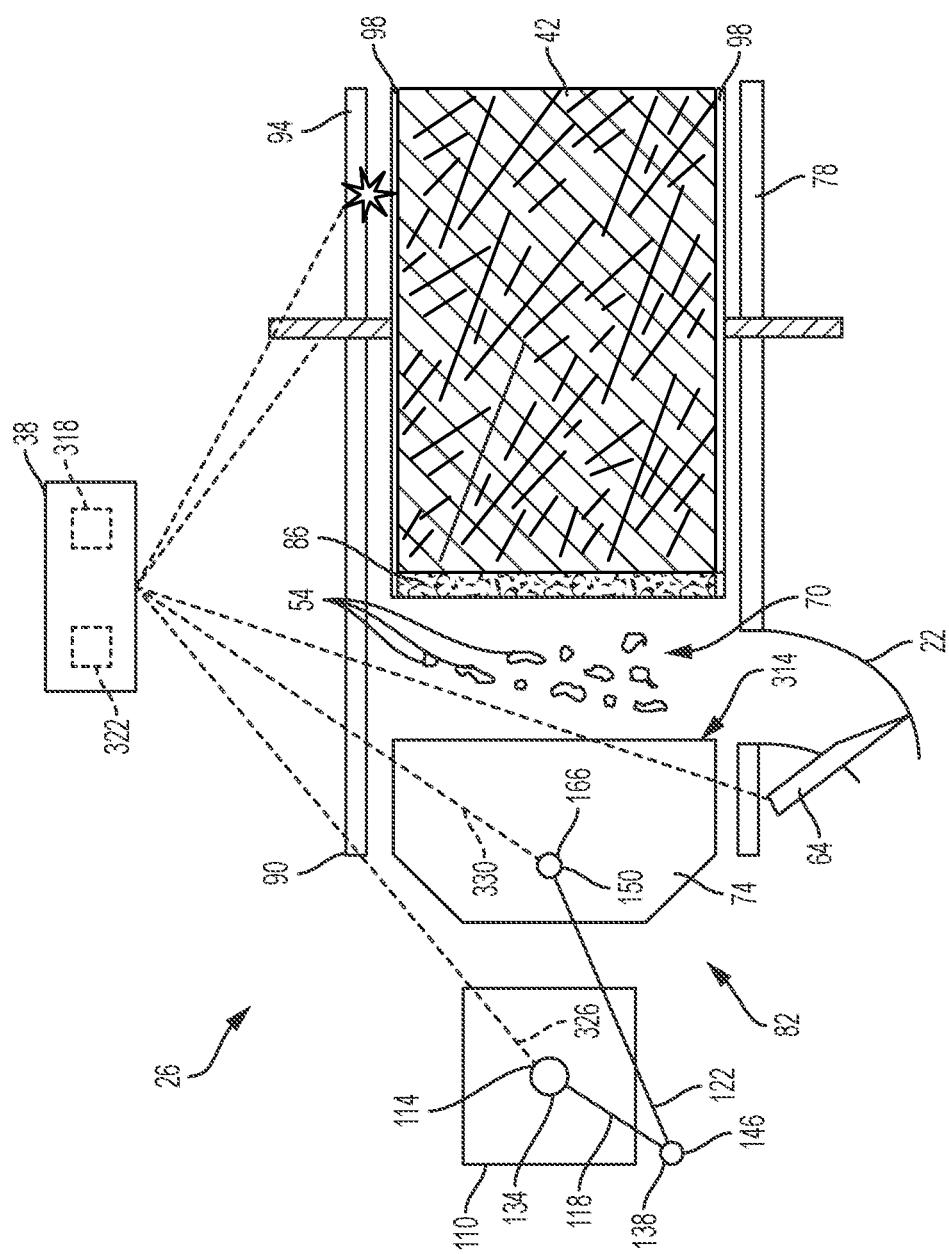
FIG. 2 is a schematic view of the baler of FIG. 1 illustrating the compression assembly, the pickup assembly, and the controller.

As shown in FIGS. 1 and 2, the feed system 22 of the baler 10 is configured to pick up crop material 54 from a support surface 58 and convey it to the compression system 26. In the illustrated implementation, the feed system 22 includes a pickup assembly 62 for receiving the crop material 54 from the support surface 58, and a delivery assembly 64 for directing the collected crop material 54 to the compression system 26. The pickup assembly 62 includes a roller baffle 66 oriented generally perpendicular to the direction of travel for picking up the crop material 54 and placing it in the baler 10.

The delivery assembly 64 of the feed system 22 directs the crop material 54 collected by the pickup assembly 62 to the compression system 26. In particular, the delivery assembly 64 is configured to direct a metered amount of crop material 54 into the baling chamber 70 during every stroke of the plunger 74 (described below). In the illustrated implementation, the delivery assembly 64 is adjustable, permitting different amounts of crop material 54 to be fed into the compression system 26 at a given time (i.e., the "feed rate"). In particular, the feed system 22 is configured to receive one or more signals from the controller 38 causing it to increase or decrease the amount of crop material 54 being delivered to the compression system 26 on a particular stroke.

Illustrated in FIG. 2, the compression system 26 of the baler 10 includes the baling chamber 70 in communication with the feed system 22, a bale case 78 at least partially defining the baling chamber 70, and the plunger assembly 82 positioned at least partially within the baling chamber 70. During operation, a metered amount of crop material or flake 54 is positioned within the baling chamber 70 by the feed system 22 whereby the plunger assembly 82 compresses the crop material 54 against already compacted crop material positioned in the bale case 78, herein referred to as the forming bale 86. The plunger assembly 82 then retracts through the baling chamber 70 as another metered amount of crop material 54 is positioned within the baling chamber 70 by the feed system 22 and the stroke begins again. With each passing stroke, the compression system 26 compresses the newly introduced crop material 54 against the face of the forming bale 86, causing the forming bale 86 to grow into a densely packed cuboid shape within the bale case 78. Once the forming bale 86 achieves the desired size and density, it is bound (e.g., by wire) to form the bale 42. The freshly created bale 42 subsequently becomes a support surface against which the next forming bale 86 may begin to form and the process is repeated. Once a bale 42 is completely formed, the bale 42 is ejected from the rear of the baler 10 for subsequent collection.

The bale case 78 is substantially rectangular in shape having a first open end 90 to receive the plunger 74 therein, and a second open end 94, opposite the first open end 90 positioned proximate the rear of the baler 10. During use, the bale case 78 acts as a container, holding the forming bale 86 and one or more completed bales 42 against which the compression system 26 compresses the newly introduced crop material 54 from the feed system 22. While doing so, the bale case 78 applies a compressive or otherwise resistive force against the forming bale 86 and any completed bales 42 to resist motion within the bale case 78 toward the second open end 94. In particular, it is this resistive force that permits the compressive force of the compression system 26 to compact the crop material 54 within the baling chamber 70.

The walls 98 of the bale case 78 are adjustable with respect to one another to vary the amount of resistive force applied to the forming bale 86 and bales 42. Specifically, the walls 98 of the bale case 78 may move inwardly to apply more pressure to the outside of the forming bale 86 or bale 42 and therefore create a greater resistive force. The walls 98 of the bale case 78 may also move outwardly, away from one another, to reduce the pressure on the outside of the forming bale 86 or bale 42 and therefore create less resistive force. Generally speaking, the greater the resistive force applied to the forming bale 86 and bales 42, the greater the amount of compression that occurs with each stroke of the compression system 26 and the denser the resulting bale 42.

Figure 3:
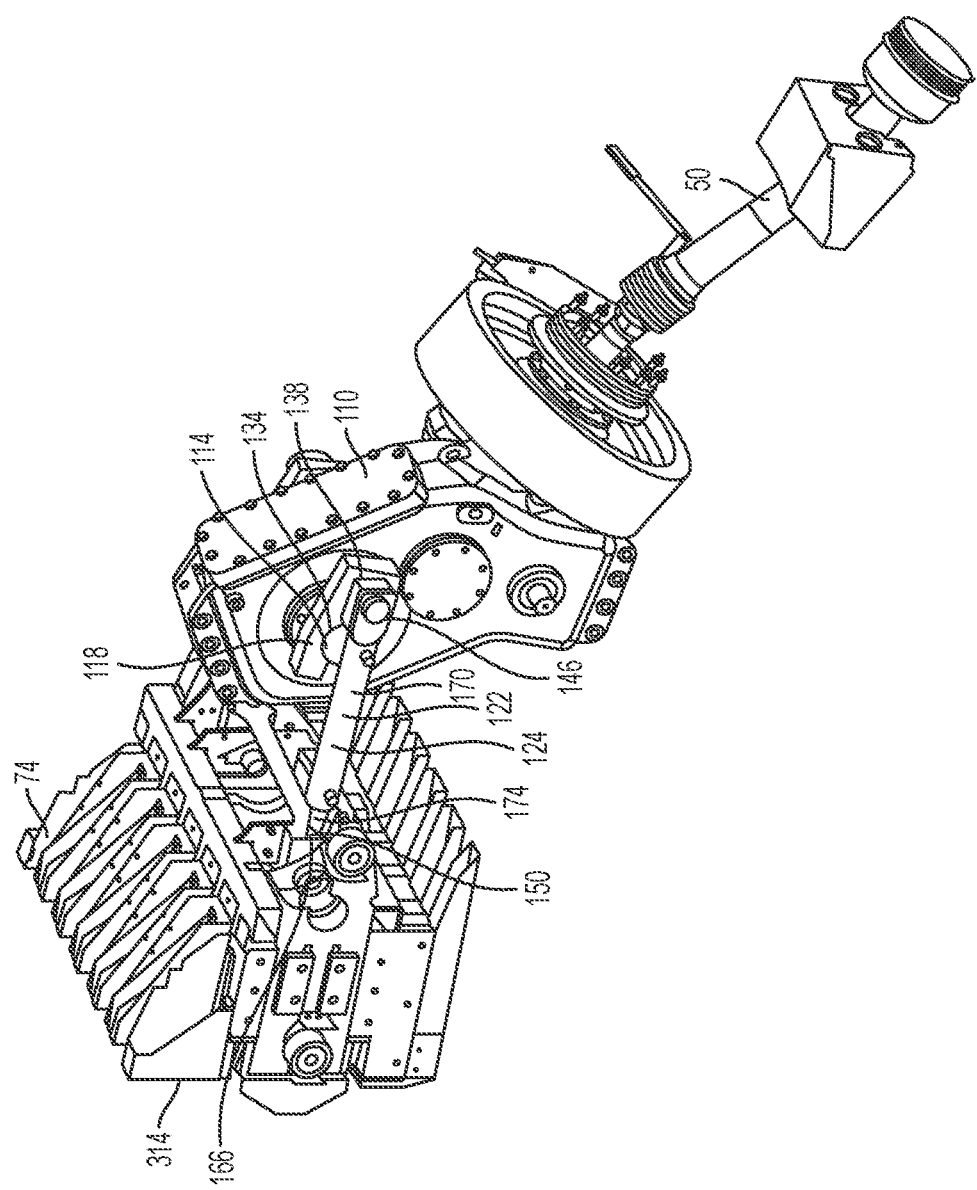
FIG. 3 is a perspective view of the compression assembly of the baler of FIG. 1.
Figure 4:
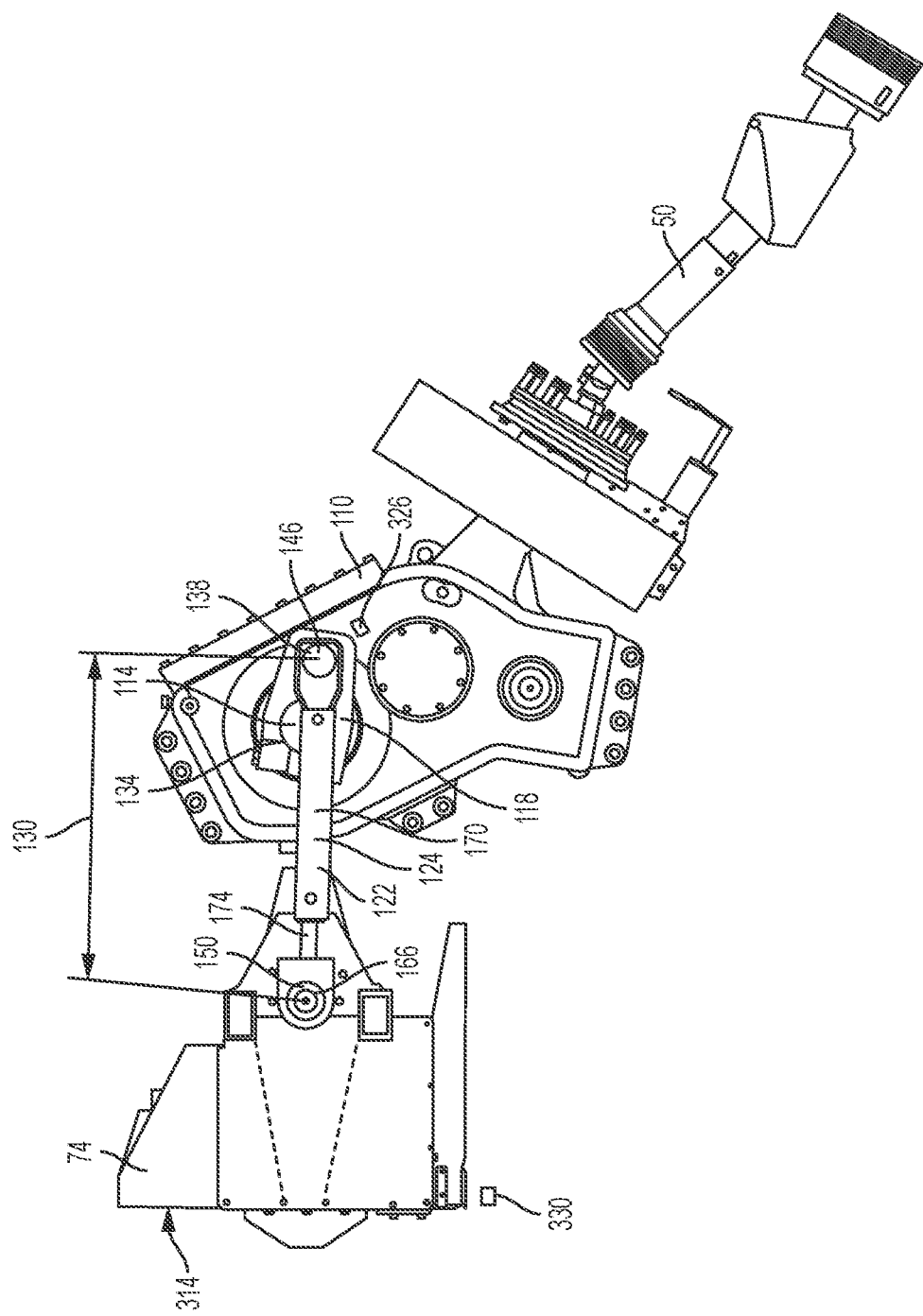
FIG. 4 is a side view of the compression assembly of the baler of FIG. 1.

Referring now to FIGS. 2-4, the plunger assembly 82 of the compression system 26 includes a gearbox 110 having an output shaft 114, a pair of crank arms 118 coupled to and rotatable with the output shaft 114, the plunger 74 movable with respect to the baling chamber 70, and a pair of variable-length connecting rods 122 each extending between and coupled to both a respective crank arm 118 and the plunger 74. The plunger assembly 82 also includes a hydraulic system 126 (FIG. 5) to at least partially control the length of the connecting rods 122 (i.e., the connector length 162, described below). In the illustrated embodiment, the gearbox 110 of the plunger assembly 82 receives input from the power takeoff shaft 50, which in turn is driven by an exterior source, such as a tractor and the like (described above). In alternative implementations, the gearbox 110 may be driven by a stand-alone power system, such as an internal combustion engine. The gearbox 110 typically includes a number of gear sets (not shown) to transmit the torque provided by the power takeoff shaft 50 to the output shaft 114 at a given gear ratio. In some implementations, the gearbox 110 may have multiple, interchangeable gear sets to permit the gear ratio provided by the gearbox 110 to be changed according to current operating conditions. While the illustrated implementation of the plunger assembly 82 includes a pair of crank arms 118 positioned on opposite sides of the gearbox 110 and a pair of connecting rods 122 coupled to the crank arms 118, it is also appreciated that additional crank arms 118 or connecting rods 122 may be present. Still further, a single crank arm 118 and a single connecting rod 122 may be used. In still other implementations, multiple connecting rods 122 may extend from a single crank arm 118.

The plunger 74 of the plunger assembly 82 is substantially rectangular in shape and includes compression surface 314 configured to engage flake 54 positioned within the baling chamber 70, and a fifth mounting point 166 coupled to the fourth mounting point 150 of a respective connecting rod 122. During use, the plunger 74 is positioned within and movable with respect to the baling chamber 70 between an extended position, where the plunger 74 is its furthest distance from the output shaft 114, and a retracted position, where the plunger 74 is positioned its closest distance to the output shaft 114. For the purposes of this application, the distance between the retracted position and the extended position is defined as the "plunger stroke length 316." In the illustrate implementation, the plunger stroke length 316 is at least partially determined by the crank throw length 144 (described below) and the connector throw length 164 (described below). During the baling process, the plunger stroke length 316 at least partially determines the density of the resulting bale 42 and therefore the magnitude of the compression forces applied to the compression surface 314 of the plunger 74. In the illustrated implementation, the plunger stroke length 316 is greater than the crank throw length 144 and greater than the connector throw length 164.

During the baling process, the plunger 74 is configured to compress crop material 54 located within the baling chamber 70 and positioned between the compression surface 314 and the forming bale 86. In particular, the plunger 74 begins each stroke from the retracted position, with a metered amount of crop material or flake 54 positioned within the baling chamber 70. The plunger 74 then moves toward the extended position capturing the newly introduced crop material 54 between itself (i.e., the compression surface 314) and the forming bale 86. In instances where a previous bale 42 has just been formed and no forming bale 86 has yet been started, the flake 54 may be captured between the plunger 74 and the previous bale 42. The moment in which the plunger 74 captures the flake 54 between the compression surface 314 and the forming bale 86 (e.g., makes initial contact with the forming bale 86 or previous bale 42) is herein referred to as the "contact point."

After the contact point, the plunger 74 continues to move toward the extended position thereby compressing the crop material 54 into the forming bale 86. After reaching the extended position, the plunger 74 begins returning back to the retracted position eventually disengaging from the forming bale 86 and moving away from the bale case 78. Once the plunger 74 has returned to its initial retracted position, the feed system 22 may position a second metered amount of crop material 54 within the baling chamber 70 and the stroke begins anew.

Each crank arm 118 of the plunger assembly 82 is substantially elongated in shape transferring torque between the output shaft 114 and a respective connecting rod 122. Each crank arm 118 defines a first mounting point 134 and a second mounting point 138 spaced a crank length 142 (FIG. 6) from the first mounting point 134. When assembled, the first mounting point 134 is coupled to and rotates together with the output shaft 114 of the gearbox 110 while the second mounting point 138 is coupled to a respective connecting rod 122. In the illustrated implementation, the first mounting point 134 includes an aperture formed into the crank arm 118 and sized to at least partially receive a portion of the output shaft 114 therein. The first mounting point 134 also includes a keyway, splines, and the like causing the output shaft 114 and crank arms 118 to rotate together as a unit. In the present application, each crank arm 118 defines a crank throw length 144 calculated as twice the crank length 142.

Each variable-length connecting rod 122 of the plunger assembly 82 is substantially elongated in shape having a third mounting point 146, and a fourth mounting point 150 spaced a connector length 162 from the third mounting point 146 and movable with respect thereto. More specifically, the third mounting point 146 is movable with respect to the fourth mounting point 150 between an extended position (see Position A of FIG. 6A), where the connector length 162 is a first length, and a retracted position (see Position B of FIG. 6A), where the connector length 162 is a second length, less than the first length. For the purposes of this application, the difference between the first length (i.e., fully extended) and the second length (i.e., fully retracted) is defined as the connector throw length 164.

In the illustrated implementation, each connecting rod 122 includes an actuator 124 in the form of a hydraulic cylinder coupled to and extending between the second mounting point 138 of the respective crank arm 118 and the fifth mounting point 166 of the plunger 74 (described below). Each actuator 124 includes a cylinder portion 170 of the hydraulic cylinder forms the third mounting point 146, and a piston portion 174 moveable with respect to the cylinder portion 170 forms the fourth mounting point 150. (FIGS. 3 and 4). While the illustrated actuator 124 is a hydraulic cylinder, in alternative implementations the actuator 234" may include a mechanical or pneumatic actuator (not shown).

Figure 5:
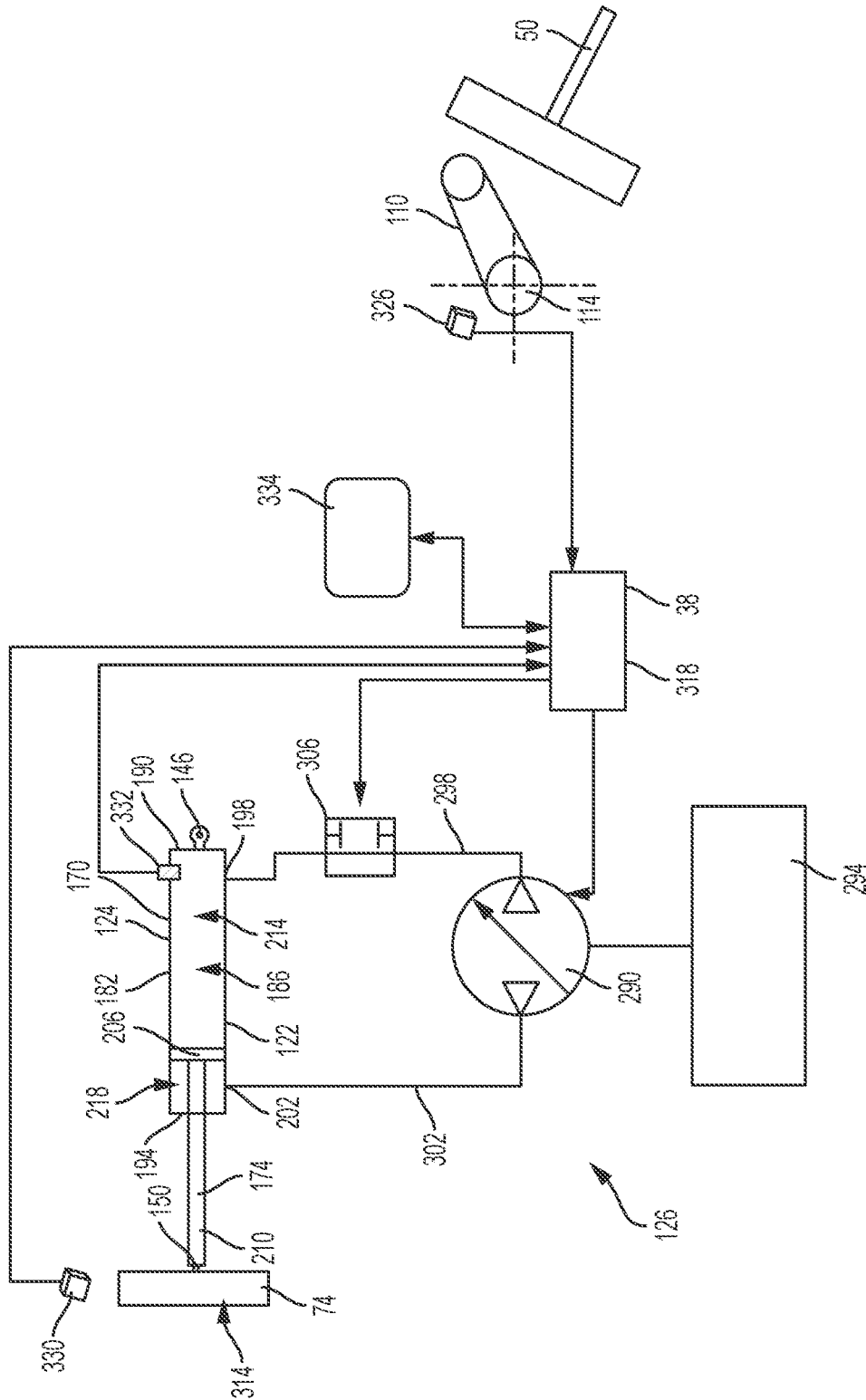
FIG. 5 is a schematic view of the hydraulic assembly of the baler of FIG. 1.

With reference to FIG. 5, the cylinder portion 170 of each actuator 124 is substantially cylindrical in shape including an annular outer wall 182 that at least partially defines an elongated cavity 186 therein. The cavity 186, in turn, includes a first end 190 proximate the third mounting point 146, and a second end 194 opposite the first end 190. The cylinder portion 170 also includes a first fluid port 198 in fluid communication with the cavity 186 and positioned proximate the first end 190 thereof. The cylinder portion 170 also includes a second fluid port 202 in fluid communication with the cavity 186 and positioned proximate the second end 194 thereof.

As shown in FIG. 5, the piston portion 174 of the actuator 124 includes a piston 206 sized to be positioned within and movable axially along the length of the cavity 186 of the cylinder portion 170 between the first end 190 and the second end 194. The piston portion 174 also includes a rod 210 extending axially from the piston 206, beyond the second end 194 of the cavity 186, to produce the fourth mounting point 150. When the actuator 124 is assembled, the piston 206 of the piston portion 174 contacts and forms a seal with the annular outer wall 182 of the cavity 186 thereby dividing the cavity 186 into a first volume 214 in fluid communication with the first fluid port 198, and a second volume 218 in fluid communication with the second fluid port 202.

During use, each actuator 124 receives hydraulic fluid from the hydraulic system 126 causing the piston portion 174 and the fourth mounting point 150 to move with respect to the cylinder portion 170 and the third mounting point 146. More specifically, when the actuator 124 receives hydraulic fluid via the first fluid port 198, fluid flows into the first volume 214 of the cavity 186 causing the first volume 214 to increase in size while fluid is forced out of the second volume 218 causing the second volume 218 to decrease in size. The resulting fluid flow forces the piston 206 toward the second end 194 of the cavity 186 (see Positions A-C of FIG. 6) causing the connector length 162 to increase. In contrast, when the actuator 124 receives hydraulic fluid via the second fluid port 202, fluid flows into the second volume 218 of the cavity 186 causing the second volume 218 to increase in size while fluid is forced out of the first volume 214 causing the first volume 214 to decrease in size. The resulting fluid flow forces the piston 206 toward the first end 190 of the cavity 186 and causes the connector length 162 to decrease.

While the present implementation illustrates the actuator 124 having the cylinder portion 170 coupled to a respective crank arm 118 and the piston portion 174 coupled to the plunger 74, it is understood that the actuator 124 may be installed in the opposite orientation (i.e., with the cylinder portion 170 coupled to the plunger 74 and the piston portion 174 coupled to the crank arm 118). In still other implementations, each connecting rod 122 may include linkages, tracks, pulleys, cables, and gearsets, in addition to the actuator 124 (see below). With continued reference to FIG. 5, the hydraulic system 126 of the plunger assembly 82 includes a pump 290 and a reservoir 294 in fluid communication with the pump 290. The hydraulic system 126 also includes a first feed line 298 extending between and in fluid communication with the pump 290 and the first fluid port 198 of a respective connecting rod 122, and a second feed line 302 extending between and in fluid communication with the pump 290 and the second fluid port 202 of the same connecting rod 122. The hydraulic system 126 also includes one or more valves (not shown) to direct the output of the pump 290 through either the first feed line 298 and/or the second feed line 302. In the illustrated implementation, the pump 290 is a variable displacement pump able to adjust the rate and pressure at which fluid is discharged therefrom. Although not shown, the hydraulic system may also include one or more safety valves to direct excess fluid to the reservoir 294.

The hydraulic system 126 may also include a lockout valve 306 positioned between and in fluid communication with the first feed line 298 and the first fluid port 198. The lockout valve 306 is adjustable between an unlocked configuration, where the first fluid port 198 is in fluid communication with the pump 290, and a locked configuration, where the first fluid port 198 is fluidly isolated from the pump 290. In the illustrated implementation, the lockout valve 306 is positioned along the length of the first feed line 298. However in alternative implementations, the lockout valve 306 may be formed into the first fluid port 198 or formed integrally with the annular wall 182 of the connecting rod 122.

In implementations where more than one connecting rod 122 is present, the hydraulic system 126 may include multiple sets of feed lines (i.e., a first feed line 298 and a second feed line 302) for each corresponding connecting rod 122. Still further, the hydraulic system 126 may include a second set of valves (not shown) to permit the hydraulic system 126 to selectively provide fluid to one or more of the connecting rods 122 at any given time. Still further, the hydraulic system 126 may include a plurality of lockout valves 306 to selectively isolate each individual connecting rod 122.

Illustrated in FIGS. 2 and 5, the controller 38 of the baler 10 includes a processor 318, a memory unit 322 in operable communication with the processor 318, one or more sensors 326, 330, 332 sending and receiving signals from the processor 318, and a user input 334 in operable communication with the processor 318. The processor 318 is also in operable communication with various elements of the hydraulic system 126 including, but not limited to, the pump 290 and one or more valves (not shown). During use, the processor 318 receives signals from the one or more sensors 326, 330, 332, combines that information with one or more predetermined control algorithms, and outputs signals to control the motion of the plunger 74.

In particular, the baler 10 includes a crank arm position sensor 326, a plunger position sensor 330, and a pressure transducer 332. The sensors 326, 330, 332 may be present individually, in plurality, or in combination. Although not illustrated, the controller 38 may also include additional sensors such as, but not limited to, a connector length sensor (not shown).

The crank arm position sensor 326 includes a position sensor mounted to a respective crank arm 118 of the plunger assembly 82 and configured to measure the relative position of the crank arm 118 with respect to the gearbox 110. The crank arm position sensor 326 may include a sensor mounted directly to the crank arm 118, or a sensor mounted on the output shaft 114. Such sensors may include Hall Effect sensors, variable resistance sensors, optical sensors, and the like.

The plunger position sensor 330 determines the relative position of the plunger 74 with respect to the baling chamber 70. The plunger position sensor 330 may include a sensor mounted directly on the plunger 74, a sensor mounted to the baling chamber 70, or a sensor mounted to the output shaft 114 of the gearbox 110. Such sensors may include Hall Effect sensors, variable resistance sensors, optical sensors, and the like.

The pressure transducer 332 detects the pressure of the hydraulic fluid positioned within the first volume 214 of the cavity 186 of a respective connecting rod 122. More specifically, the pressure transducer 332 is in fluid communication with the first volume 214 of the cavity 186. In the illustrated implementation, the pressure transducer 332 is spliced into the first feed line 298 of the hydraulic system 126. However in alternative implementations, the pressure transducer 332 may be formed into the first fluid port 198 or formed integrally with the annular wall 182 of the connecting rod 122. Such sensors may include pressure sensors and the like. In still other implementations, the pressure transducer 332 may also be utilized to determine the force applied to the compression surface 314 of the plunger 74. In such implementations, the processor 318 includes one or more conversion calculations to convert the pressure readings of the pressure transducer 332 into plunger force readings.

Still further, in implementations where more than one connecting rod 122 is present, a plurality pressure transducers 332 may be present, each corresponding with a particular connecting rod 122. In such implementations, the processor 318 may take into account the pressure readings from each transducer 332 to calculate an overall or general pressure reading applicable to the total force being applied to the plunger 74. More specifically, the processor 318 may take into account the pressure readings from each transducer 332 by taking the average thereof, combining the readings together, or placing each reading within a predetermined algorithm. Furthermore, the processor 318 may also calculate a local pressure reading by taking into account a subset of pressure transducers 332 corresponding to a subset of connecting rods 122. For example, in instances where two connecting rods 122 are present, the processor 318 may calculate the total force applied to the plunger 74 by utilizing the signals provided by both pressure transducers 332. Furthermore, the processor 318 may calculate the localized force being applied to a first location of the plunger 74 by only taking into account the pressure transducer 332 corresponding with the connecting rod 122 coupled to the plunger 74 proximate the first location. Still further, the processor 318 may calculate the localized force being applied to a second location of the plunger 74 by only taking into account the pressure transducer 332 corresponding with the connecting rod 122 coupled to the plunger 74 proximate the second location.

The processor 318 of the baler 10 monitors the motion of the plunger 74 and the crank arm 118 and outputs signals to the hydraulic system 126 to control the extension and contraction of the connecting rod 122 to produce the desired plunger motion or "stroke profile." More specifically, the processor 318 outputs signals to the pump 290 and valves (not shown) of the hydraulic system 126 to direct the flow of hydraulic fluid toward either the first fluid port 198 or the second fluid port 202. As the plunger 74 moves along its stroke path, the processor 318 receives a stream of information in the form of signals from the sensors 326, 330, 332 positioned throughout the baler 10. In particular, the processor 318 may receive data including, but not limited to, the position of the plunger 74, the rotational position of the crank arm 118 (i.e., the crank position), the connector length 162, the pressure of the hydraulic fluid, and the like. The processor 318 then compiles the raw information received from the sensors 326, 330, 332 and processes it to determine the desired connector length 162 as the stroke progresses.

During the plunging process, each stroke profile may include various quantities and combinations of different stages or steps to produce the desired stroke profile. For example, each stroke profile may include an extension stage 338, a locking stage 340, a locked compression stage 346, an unlocking stage 350, and a retraction stage 354. In the illustrated implementation, the timing, frequency, and duration of the various stages are generally dependent upon the relative location of the crank arm 118 or "crank position." For the purposes of this application, the crank position is defined as an axis extending radially outwardly from the first mounting point 134 through the second mounting point 138. As such, the 3 o'clock crank position (Position A of FIG. 6) generally corresponds with the retracted position of the plunger 74 and the 9 o'clock crank position (Position D of FIG. 6) generally corresponds with the extended position of the plunger 74. In alternative implementations, the timing, frequency, and duration of the various stages may also be dependent upon the position of the plunger 74, the forces exerted on the plunger 74, the connector length 162, the hydraulic fluid pressure levels, and the like.

Figure 6:
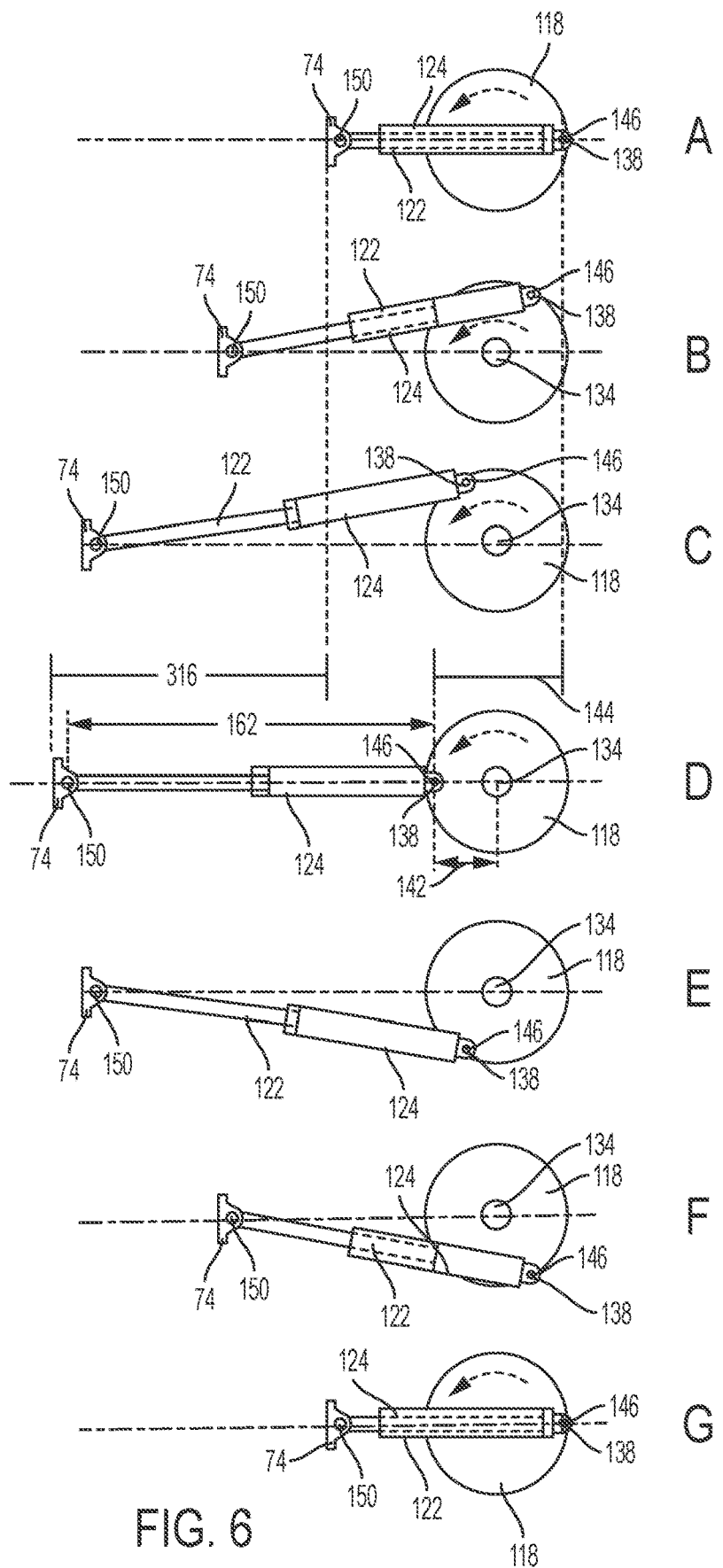
FIG. 6 illustrates the variable-length connecting rod of FIG. 2 in various positions corresponding to a first stroke profile.
Figure 6A:
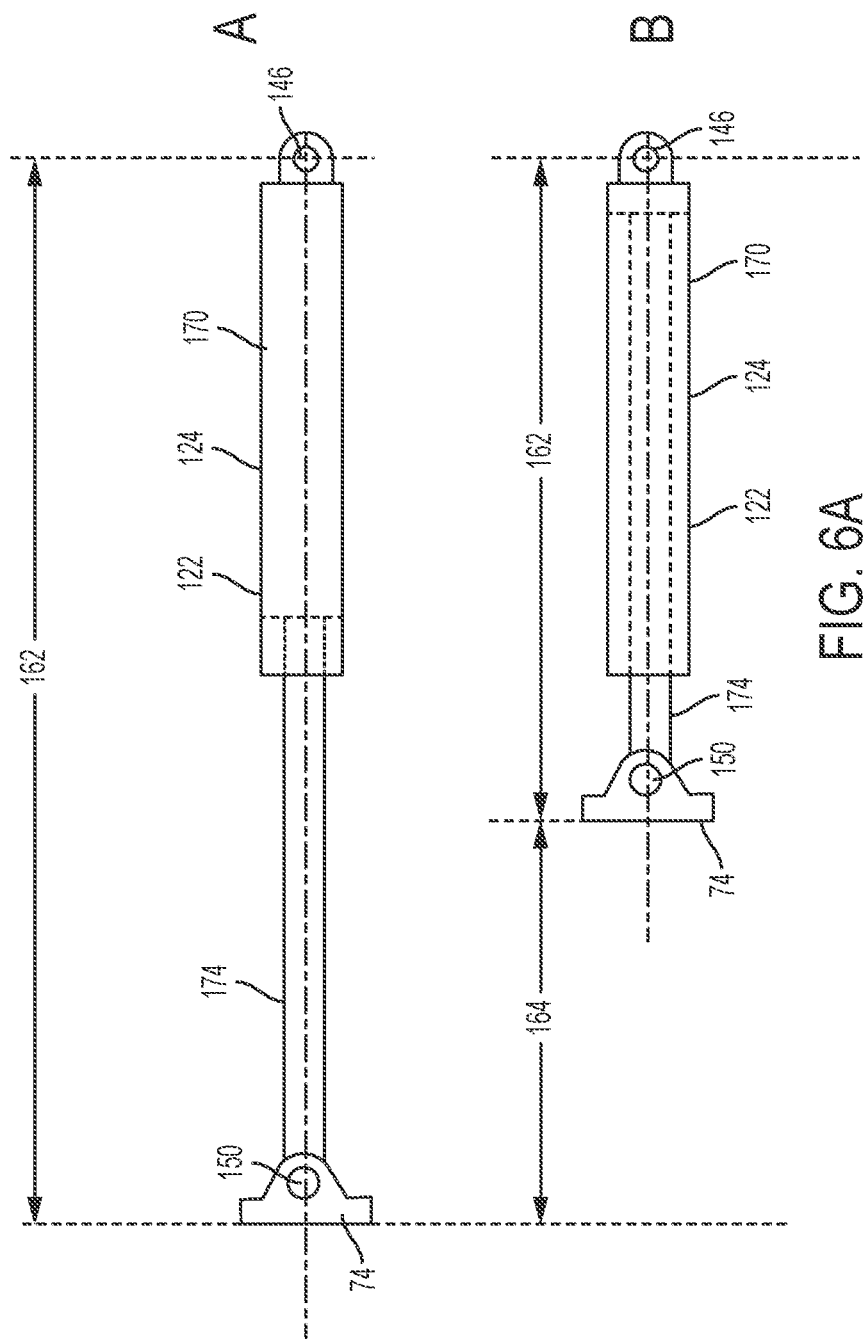
FIG. 6A illustrates the variable-length connecting rod of FIG. 2 in an extended and retracted configuration.
Figure 8:
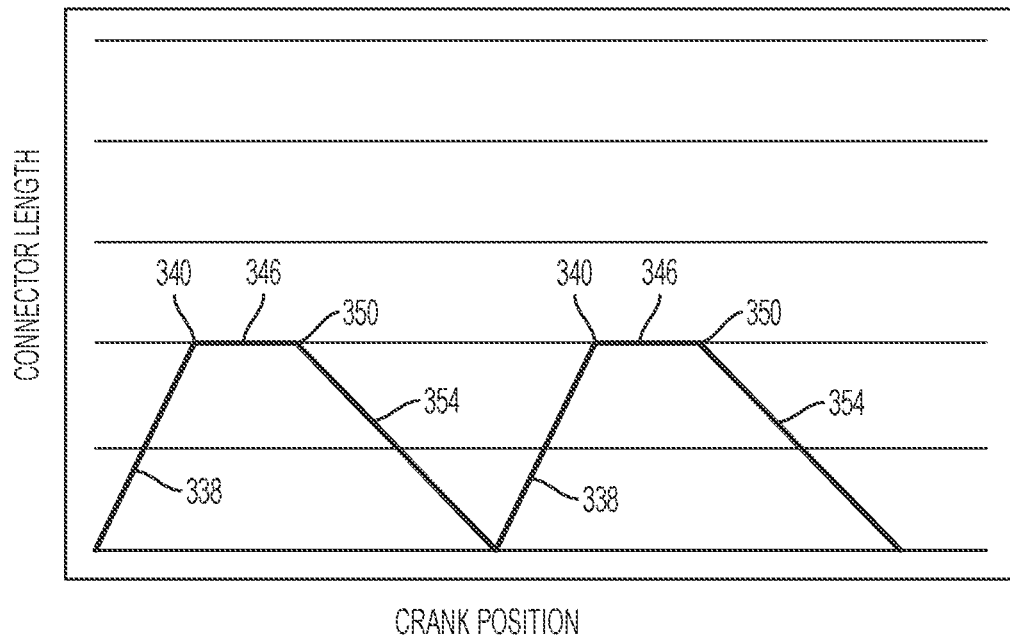
FIG. 8 is a chart correlating the connecting rod length for a given crank position with respect to the first stroke profile.

As illustrated in FIGS. 6 and 8, a first stroke profile begins with the crank arm 118 in the 3 o'clock position, the connecting rod 122 in the retracted position, and the plunger 74 in the retracted position (Position A of FIG. 6). During the duration of the stroke, the crank arm 118 travels in a counter-clockwise direction at a relatively constant rotational speed. In alternative implementations, the rotational speed and direction of the crank arm 118 may be adjusted as necessary.

During the first stroke profile, the processor 318 monitors and controls the extension stage 338 when the crank arm 118 is in the 3 o'clock position (Position A of FIG. 6). During the extension stage 338, the processor 318 sends signals to the hydraulic system 126 instructing the pump 290 to direct hydraulic fluid via the first feed line 298 to the first fluid port 198. As described above, this causes the third mounting point 146 to move away from the fourth mounting point 150 and the connector length 162 of the connecting rod 122 to increase. The connector length 162 continues to increase throughout the duration of the extension stage 338 (FIG. 8) at a speed generally dictated by the rate at which the pump 290 is providing fluid to the first volume 214. As such, the motion of the plunger 74 during the extension stage 338 is determined by a combination of the speed of the rotation of the crank arm 118 (i.e., with the second mounting point 138 moving toward the first open end 90 of the bale case 78) and the speed at which the connector length 162 is increasing.

In the illustrated implementation, the extension stage 338 continues until the crank arm 118 reaches the 10 o'clock position (Position C of FIG. 6). In alternative implementations, the extension stage 338 lasts until the crank arm 118 reaches between approximately the 12 o'clock position and approximately the 10 o'clock position. In still other implementations, the processor 318 may remain in the extension stage 338 until the contact point (described above) is reached. In still other implementations, the processor 318 may remain in the extension stage 338 until the connector length 162 reaches a predetermined value. In still other implementations, the processor 318 may remain in the extension stage until the fluid pressure within the first volume 214 rises above a predetermined value. In still other implementations, the duration of the extension stage 338 may take into consideration a combination of the factors listed above.

After the extension stage 338, the processor 318 enters the locking stage 340 (Position C of FIG. 6). During the locking stage 340, the processor 318 sends a signal to the lockout valve 306 causing it to switch from the unlocked configuration to the locked configuration. Once the valve 306 is in the locked configuration, the first volume 214 of the connecting rod 122 becomes fluidly isolated from the hydraulic system 126. By doing so, the lockout valve 306 has effectively "trapped" any hydraulic fluid contained within the first volume 214 therein. The incompressible nature of the hydraulic fluid within the first volume 214 causes the connecting rod 122 to effectively become rigid and restricts any relative movement between the third mounting point 146 and the fourth mounting point 150. In the illustrated implementation, the locking stage 340 occurs almost instantaneously (i.e., while the crank arm 118 is in Position C of FIG. 6).

In addition to fixing the connector length 162, the locking stage 340 also serves to isolate any pressure exerted onto the connecting rod 122 from the hydraulic system 126. As such, the hydraulic system 126 need only have the capacity to withstand and produce the hydraulic pressures necessary to extend and retract the connecting rod 122 without any significant resistance. The hydraulic system 126 does not need to withstand or produce the pressures necessary for compression of the flake 54 positioned within the baling chamber 70.

In addition to locking the lockout valve 306, the processor 318 also sends signals to the pump 290 and valves of the hydraulic system 126 instructing them to stop providing fluid to the first fluid port 198 of the connecting rod 122. In instances where residual fluid flow exists (i.e., due to the coasting of the pump 290 and the like), one or more over-pressure valves (not shown) may be positioned between the pump 290 and the lockout valve 306 to bleed off pressure and direct excess fluid into the reservoir 294.

After the locking stage 340, the processor 318 enters the locked compression stage 346 (Positions C-E of FIG. 6). During the compression stage 346, the connector length 162 remains fixed (FIG. 8). As such, only counter-clockwise rotation of the crank arm 118 influences the motion of the plunger 74. It is during the compression stage 346 that the compression surface 314 of the plunger 74 traps the flake 54 between itself and the forming bale 86 and applies the necessary pressure to compress the flake 54 into the forming bale 86. During the compression stage 346, the fluid pressure within the first volume 214 increases as the pressure exerted by the compression surface 314 against the flake 54 and forming bale 86 increases.

In the illustrated implementation, the compression stage 346 continues until the crank arm 118 reaches the 7 o'clock position (Position E of FIG. 6). In alternative implementations, the processor 318 remains in the compression stage 346 until the crank arm 118 reaches approximately the 9 o'clock position to approximately the 7 o'clock position. In still other implementations, the processor 318 remains in the compression stage 346 until the pressure applied to the compression surface 314 of the plunger 74 drops below a predetermined value. When the pressure applied to the compression surface 314 is monitored, the processor 318 may calculate the pressure value based at least in part on the signals sent from the pressure transducer 332. In still other implementations, the processor 318 remains in the compression stage 346 until the pressure within the first volume 214 falls below a predetermined level as determined by the pressure transducer 332. In still other implementations, the processor 318 remains in the compression stage 346 until the plunger 74 disengages from the forming bale 86. In still other implementations, the processor 318 remains in the compression stage 346 until the plunger 74 is in a predetermined position. In still other implementations, the duration of the compression stage 346 may be influenced by a combination of the factors listed above.

After the compression stage 346, the processor 318 begins the unlocking stage 350. During the unlocking stage 350 the processor 318 sends a signal to the lockout valve 306 causing it to switch from the locked configuration to the unlocked configuration. By doing so, fluid communication between the first volume 214 and the hydraulic system 126 is restored and the third mounting point 146 is able to move with respect to the fourth mounting point 150. In the illustrated implementation, the unlocking stage 350 occurs almost instantaneously.

After the unlocking stage 350, the processor enters the retraction stage 354 (Positions E-G of FIG. 6). During the retraction stage 354, the processor 318 sends signals to the hydraulic system 126 instructing the pump 290 to direct hydraulic fluid via the second feed line 302 to the second fluid port 202. As described above, this causes the third mounting point 146 to move toward the fourth mounting point 150 and the connector length 162 of the connecting rod 122 to decrease. The connector length 162 continues to decrease throughout the duration of the retraction stage 354 (FIG. 8) at a speed generally dictated by the rate at which the pump 290 is providing fluid to the second volume 218. As such, the motion of the plunger 74 during the retraction stage 354 is determined by the speed of the rotation of the crank arm 118 in a counter-clockwise direction (i.e., with the second mounting point 138 moving away from the first open end 90 of the bale case 78) and the speed at which the connector length 162 is decreasing.

In the illustrated implementation, the retraction stage 354 continues until the crank arm 118 returns to the 3 o'clock position (Position G of FIG. 6) at which time the processor 318 switches to the extension stage 338 and the process begins anew (FIG. 8). In alternative implementations, the processor 318 remains in the retraction stage 354 until the connector length 162 reaches a predetermined value. In still other alternative implementations, the processor 318 remains in the retraction stage 354 based on a combination of the above described factors.

Figure 7:
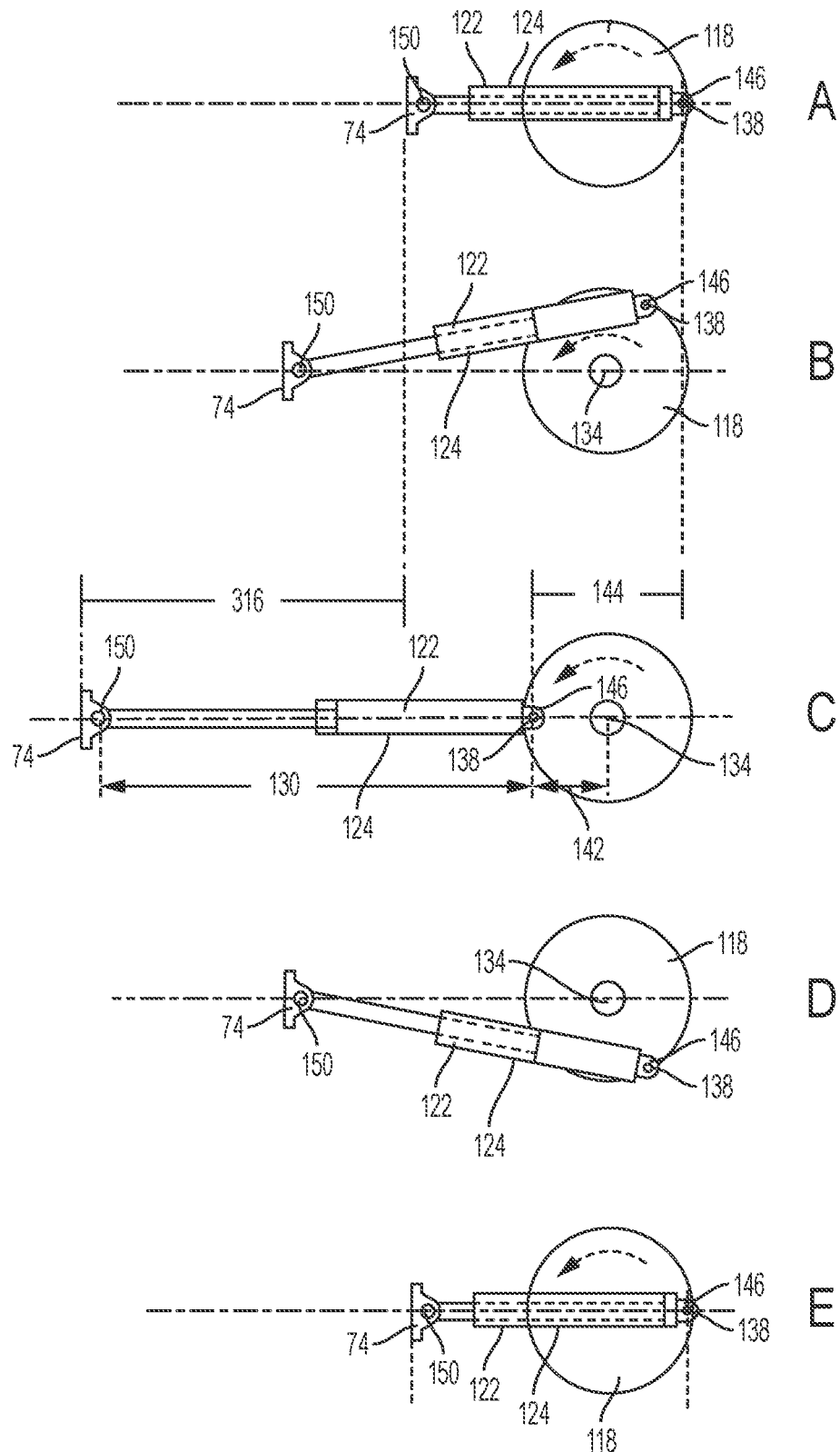
FIG. 7 illustrates the variable-length connecting rod of FIG. 2 in various positions corresponding to a second stroke profile.
Figure 9:
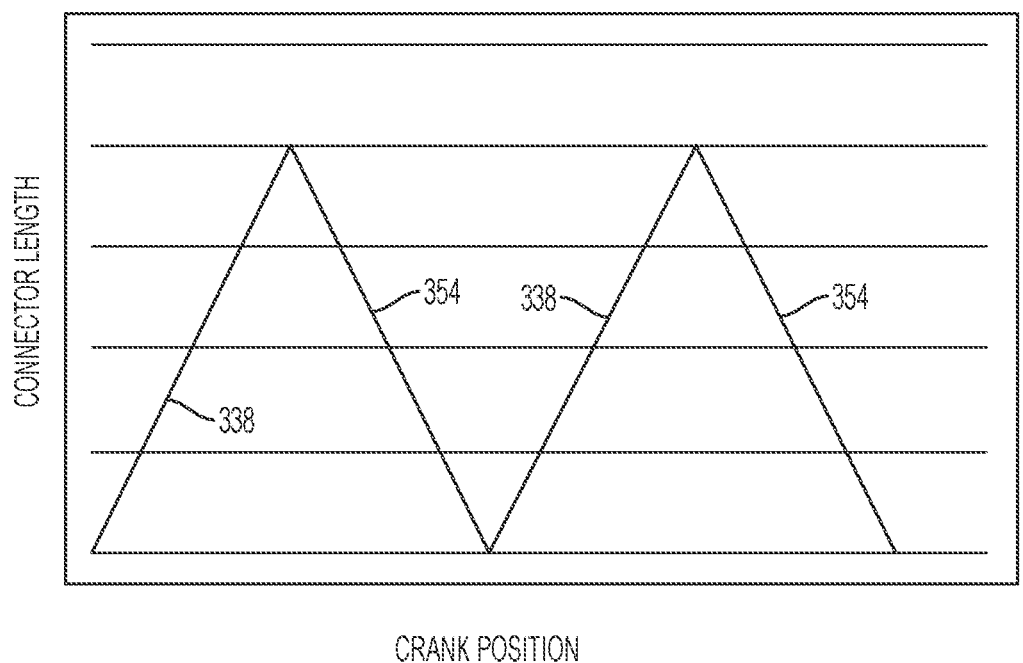
FIG. 9 is a chart correlating the connecting rod length for a given crank position with respect to the second stroke profile.

Illustrated in FIGS. 7 and 9, a second stroke profile begins with the crank arm 118 in the 3 o'clock position, the connecting rod 122 in the retracted position, and the plunger 74 in the retracted position (Position A of FIG. 7). During the stroke, the crank arm 118 travels in a counter-clockwise direction at a relatively constant rotational speed. However in alternative implementations, the rotational speed and direction of the crank arm 118 may be adjustable.

With the crank arm 118 in the 3 o'clock position, the processor 318 enters the extension stage 338 (Positions A-C of FIG. 7). During the extension stage 338, the processor 318 sends signals to the hydraulic system 126 instructing the pump 290 to direct hydraulic fluid via the first feed line 298 to the first fluid port 198. As described above, this causes the connector length 162 of the connecting rod 122 to increase. The connector length 162 continues to increase throughout the duration of the extension stage 338 (FIG. 9) at a speed generally dictated by the rate at which the pump 290 is providing fluid to the first volume 214. As such, the motion of the plunger 74 during the extension stage 338 is determined by a combination of the speed of the rotation of the crank arm 118 (i.e., with the second mounting point 138 moving toward the first open end 90 of the bale case 78) and the speed at which the connector length 162 is increasing.

Unlike the first stroke profile, the second stroke profile remains in the extension stage beyond the contact point and until the crank arm 118 reaches the 9 o'clock position (Position C of FIG. 7). As such, the compression force applied by the plunger 74 is provided by the movement of the crank arm 118 and the hydraulic system 126. Therefore, the pump 290 and first feed line 298 must be of sufficient durability to withstand the pressures exerted during the compression stage. With that said, given that the processor 318 is in the extension stage 338 over a longer range of the crank arm 118 rotation, a larger plunger stroke length 316 can be produced for a given crank arm 118 rotation speed.

After the extension stage 338, the processor 318 enters the retraction stage 354 (Positions C-E of FIG. 7). During the retraction stage 354, the processor 318 sends signals to the hydraulic system 126 instructing the pump 290 to direct hydraulic fluid via the second feed line 302 to the second fluid port 202. As described above, this causes the third mounting point 146 to move toward the fourth mounting point 150 and the connector length 162 of the connecting rod 122 to decrease. The connector length 162 continues to decrease throughout the duration of the retraction stage 354 (FIG. 9) at a speed generally dictated by the rate at which the pump 290 is providing fluid to the second volume 218. As such, the motion of the plunger 74 during the retraction stage 354 is determined by the speed of the rotation of the crank arm 118 in a counter-clockwise direction (i.e., with the second mounting point 138 moving away from the first open end 90 of the bale case 78) and the speed at which the connector length 162 is decreasing.

While the first and second stroke profiles are described assuming the hydraulic system 126 provides similar quantities of fluid to both connecting rods 122, it is appreciated that in alternative implementations the hydraulic system 126 may provide different quantities of fluid to each individual connecting rod 122. In such implementations, the processor 318 is able to adjust the horizontal orientation of the compression surface 314 with respect to the baling chamber 70. In contrast, providing the similar levels of fluid to both connecting rods 122 cause the orientation of the compression surface 314 to remain unchanged.

Figure 10A:
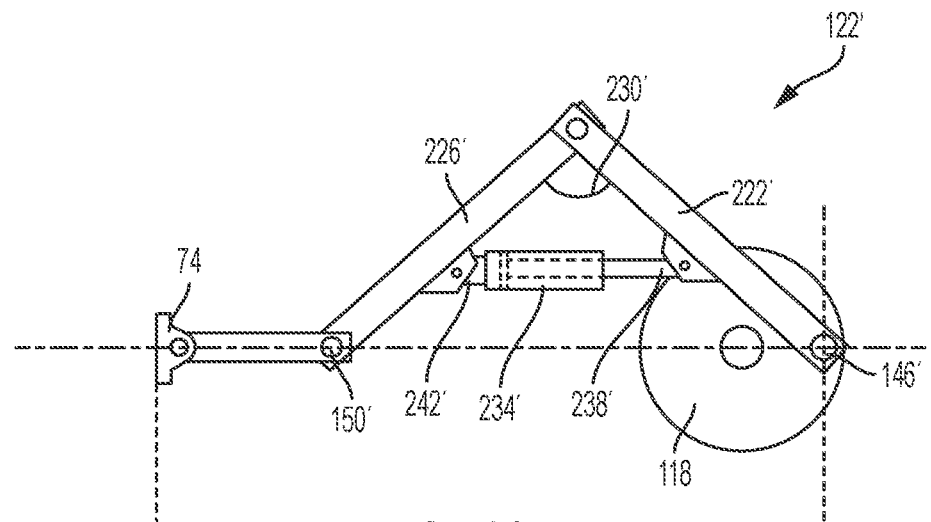
FIG. 10 illustrates an alternative implementation of the variable-length connecting rod in various positions.
Figure 10B:
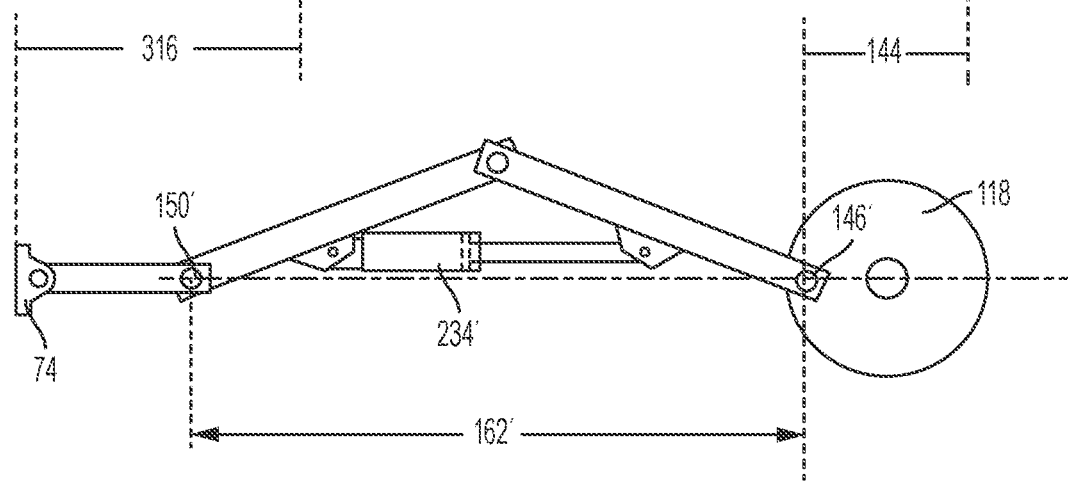

FIG. 10 illustrates an alternative implementation of a connecting rod 122'. The connecting rod 122' is substantially similar to the connecting rod 122 illustrated in FIGS. 3-4 and 6-7 except for those elements described herein. The connecting rod 122' includes a first link 222' including the third mounting point 146', a second link 226' pivotably coupled to the first link 222' opposite the third mounting point 146' and including the fourth mounting point 150'. The first and second links 222', 226' form a first angle 230' therebetween which in turn generally dictates the distance between the third mounting point 146' and the fourth mounting point 150' (i.e., at least partially defines the connector length 162'). As such, the larger the first angle 230' (up to 180 degrees), the greater the connector length 162'. In contrast, the smaller the first angle 230', the smaller the connector length 162' (compare Position B to Position A in FIG. 10).

The connecting rod 122' also includes an actuator 234' positioned between and coupled to both the first link 222' and the second link 226'. The actuator 234' includes a first end 238' coupled to the first link 222', and a second end 242' coupled to the second link 226'. During use, the length of the actuator 234' (herein defined as the distance between the first end 238' and the second end 242') is adjustable causing the first angle 230' between the links 222', 224' to change and, as described above, the connector length 162' to vary. More specifically, connecting rod 122' is configured such that when the actuator 234' increases in length, the first angle 230' and the connector length 162' increases (Position B of FIG. 10). In contrast, when the actuator 234' decreases in length, the first angle 230' and the connector length 162' decreases (Position A of FIG. 10). In the illustrated implementation, the actuator 234' includes a hydraulic cylinder in operable communication with the hydraulic system 126 and similarly configured as with the connecting rod 122 described above. In alternative implementations, however, electric and pneumatic actuators (not shown) may instead be used. In still other implementations, the actuator's orientation may be flipped.

In the illustrated implementation, the first and the second ends 238', 242' of the actuator 234' are coupled to their respective links 222', 224' proximate the link's center. As a result, a given change in length of the actuator 234' results in a larger change in the connector length 162. In alternative implementations, the mounting locations of the first and second ends 238', 242' may be modified with respect to the third and fourth mounting points 146', 150' to adjust the mechanical advantage provided by the links 222', 224'.

Figure 11:
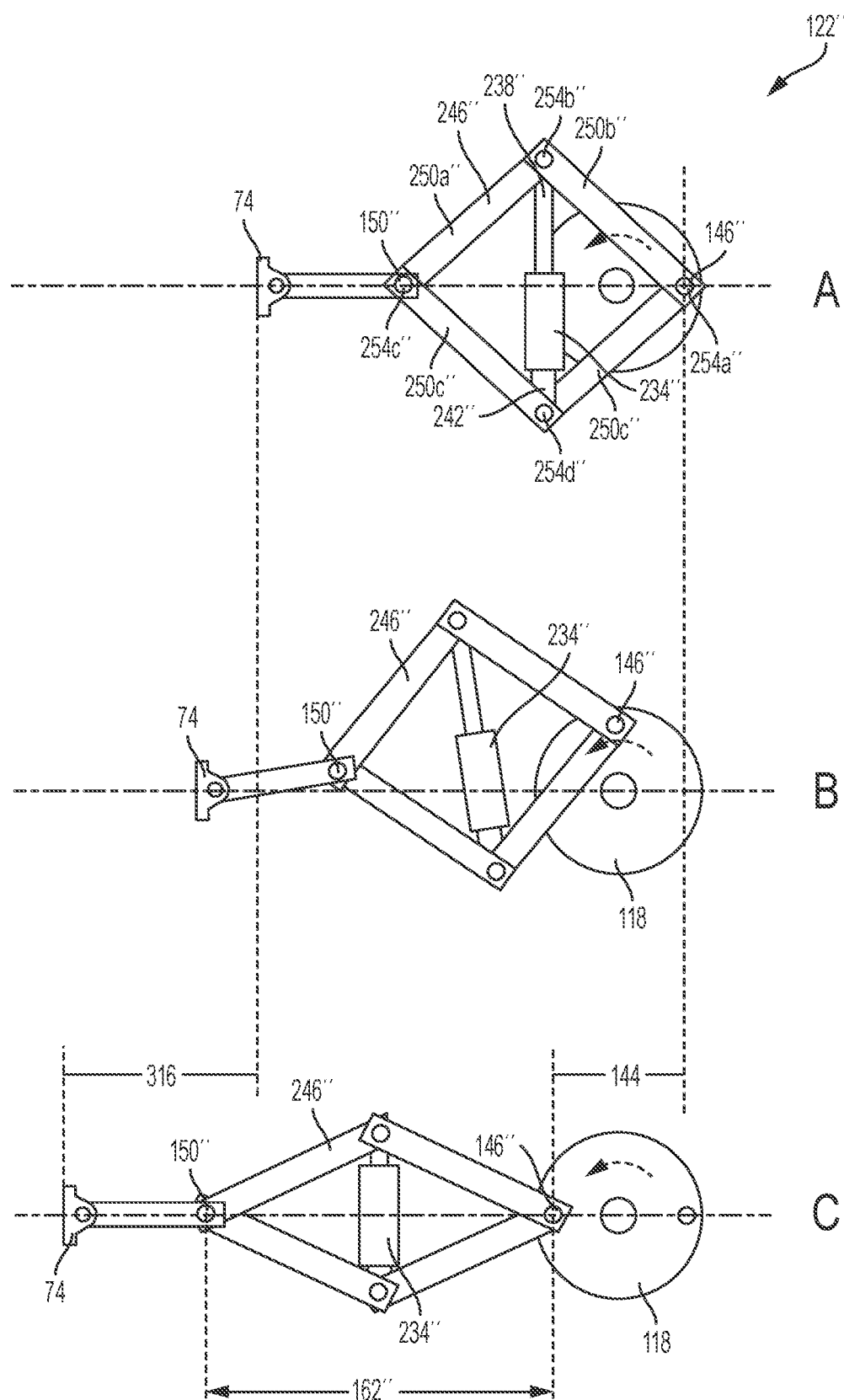
FIG. 11 illustrates an alternative implementation of the variable-length connecting rod in various positions.

FIG. 11 illustrates another alternative implementation of a connecting rod 122". The connecting rod 122" is substantially similar to the connecting rod 122' illustrated in FIG. 10 except for the elements described herein. The connecting rod 122" includes a linkage assembly 246" formed from four individual links 250a", 250b", 250c", and 250d" coupled together with a plurality of pins 254a", 254b", 254c", and 254d" to form a parallelogram shape. In the illustrated implementation, pin 254a" forms the third mounting point 146" and pin 254c" forms the fourth mounting point 150". Via the pins 254a", 254b", 254c", and 254d", each link 250a", 250b", 250c", and 250d" is able to pivot with respect to all adjacent links causing the distance between opposing pins to change. More specifically, each change in distance between opposing pins causes a reactionary change in distance between the alternative pair of opposing pins. For example, shortening the distance between pins 254b" and 254d" results in an increase in distance between pins 254a" and 254c". (Compare Position A to Position C in FIG. 11). In the illustrated implementation, all four links 250a", 250b", 250c", and 250d" are equal in length; however in alternative implementations, the relative size of each link may be altered to provide the desired geometric configuration.

The connecting rod 122" also includes an actuator 234" extending between and coupled to the linkage assembly 246". The actuator 234" includes a first end 238" coupled to pin 254b", and a second end 242" coupled to pin 254d". In the illustrated implementation, the actuator 234" is a hydraulic cylinder in operable communication with the hydraulic system 126 similar to the connecting rod 122. However, in alternative implementations the actuator 234" may include a mechanical or pneumatic actuator (not shown). In still other implementations, the actuator's orientation may be flipped.

During use, the length of the actuator 234" (i.e., the distance between the first end 238" and the second end 242") is adjustable causing the distance between pins 254b" and 254d" to vary. Therefore, increasing the length of the actuator 234" causes the distance between pins 254b" and 254d" to increase. This increase in length causes the distance between pin 254a" (i.e., the third mounting point 146") and pin 254c" (i.e., the fourth mounting point 150") to decrease. (See Position A of FIG. 11). As such, the connector length 162" decreases. Alternatively, decreasing the length of the actuator 234" causes the distance between pins 254b" and 254d" to decreases which results in the distance between pin 254a" and pin 254c" to increase. (See Position C of FIG. 11). As such, the connector length 162" increases.

Figure 12:
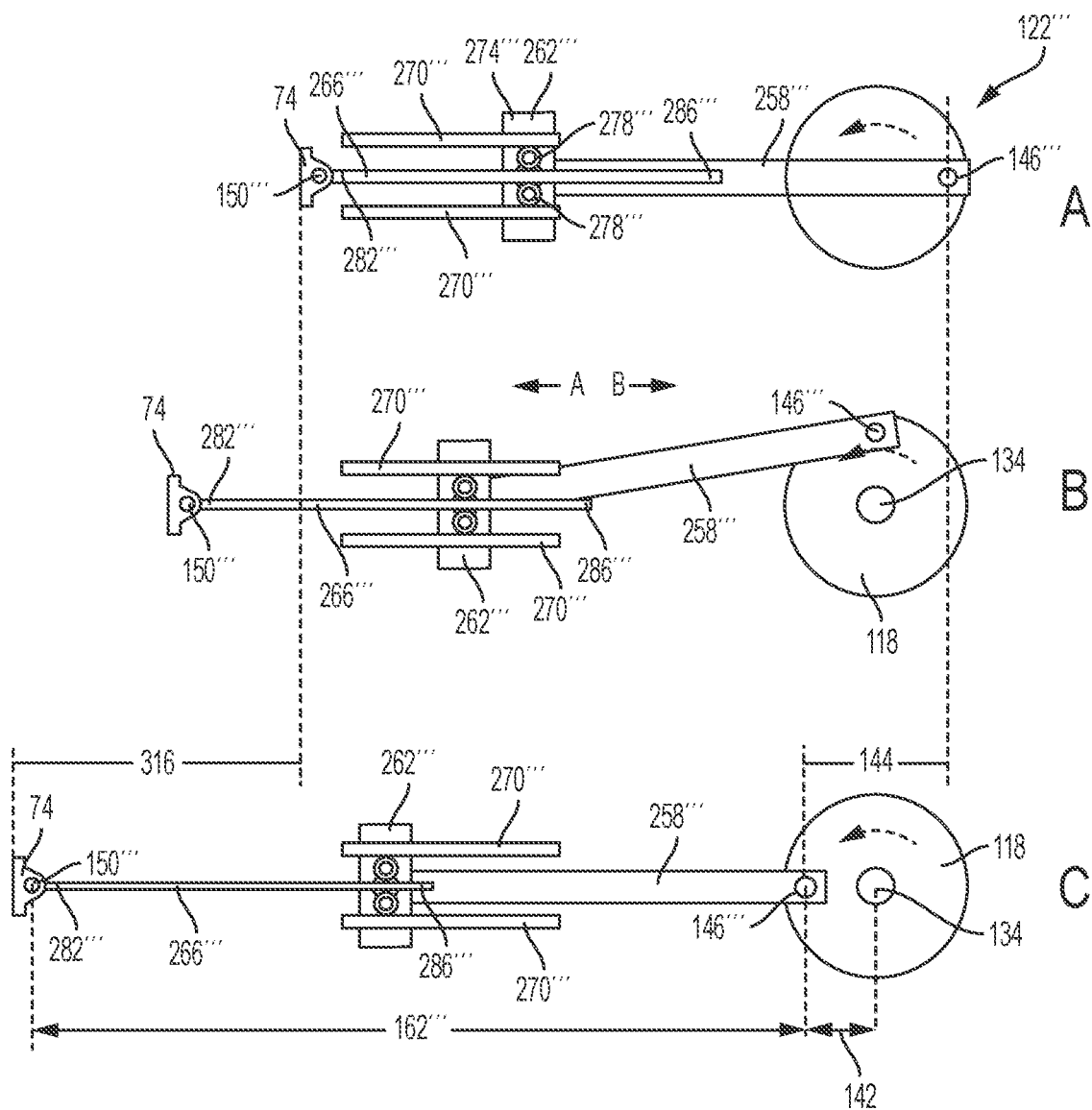
FIG. 12 illustrates an alternative implementation of the variable-length connecting rod in various positions.

FIG. 12 illustrates another alternative implementation of the connecting rod 122'''. The connecting rod 122''' includes a first link 258''' forming the third mounting point 146', a gear assembly 262' coupled to the first link 258''' opposite the third mounting point 146', and a second link 266' in operable communication with the gear assembly 262' and forming the fourth mounting point 150'''. The connecting rod 122''' also includes a pair of tracks 270' fixedly mounted with respect to the frame 14 of the baler 10 and forming a plurality of gear teeth thereon (not shown).

The gear assembly 262''' of the connecting rod 122''' includes a carriage 274''' coupled to the first link 258''', and a pair of gears 278''' pivotably mounted to the carriage 274'''. In the illustrated implementation, the carriage 274''' is coupled to the first link 258''' opposite the third mounting point 146'''.

The gears 278''' operatively engage the teeth (not shown) of the tracks 270'''. As such, any movement of the carriage 274''' along the length of the tracks 270''' causes the gears 278''' to rotate with respect to the carriage 274'''.

The second link 266''' of the connecting rod 122''' is substantially elongated in shape having a first end 282''' forming the fourth mounting point 150''', and a second end 286''' opposite the first end 282''' defining a plurality of gear teeth (not shown). When the connecting rod 122''' is assembled, the gear teeth of the second link 266''' engage both gears 278''' of the gear assembly 262'''.

During use, rotation of the crank arm 118 (and the first link 258') causes the carriage 274''' to reciprocate along the length of the tracks 270''' between a first position (Position C of FIG. 12) and a second position (Position A of FIG. 12). As the carriage 274''' moves toward the first position (i.e., in direction A), the upper gear 278''' rotates in a clockwise direction while the lower gear 278''' rotates in a counterclockwise direction. The rotation of the gears 278''' then cause the second link 266''' to move in direction A with respect to the carriage 274'''. As such, the motion of the carriage 274''' with respect to the tracks 270''' and the motion of the second link 266''' with respect to the carriage 274''' results in the fourth mounting point 150''' moving away from the third mounting point 146''' a distance that is greater than the crank throw length 144 of the crank arm 118. In contrast, as the carriage 274''' moves toward the second position (i.e., in direction B), the upper gear 278''' rotates in a counter-clockwise direction while the lower gear 278''' rotates in a clockwise direction. The rotation of the gears 278''' causes the second link 266''' to move in direction B with respect to the carriage 274'''. As such, the motion of the carriage 274''' with respect to the tracks 270''' and the motion of the second link 266''' with respect to the carriage 274''' results in the fourth mounting point 150''' moving toward the third mounting point 146''' a distance that is greater than the crank throw length 144 of the crank arm 118.

Various features of the disclosure are set forth in the following claims.

What is claimed is:

1. A baler comprising:
   a frame;
   a feed system coupled to the frame;
   a baling chamber;
   a gearbox;
   a crank arm driven by the gearbox;
   a plunger at least partially positioned within and reciprocally movable with respect to the baling chamber;
   a connecting rod extending between and coupled to both the crank arm and the plunger, wherein the connecting rod defines a connector length, and wherein the connecting rod defines a fluid volume therein; and
   a hydraulic system in operable communication with the connecting rod, the hydraulic system including:
      a pump,
      a first feed line extending between and in fluid communication with the fluid volume of the connecting rod and the pump, and
      a lockout valve adjustable between a first configuration in which the fluid volume is in fluid communication with the pump, and a second configuration in which the fluid volume is not in fluid communication with the pump, and
      wherein the lockout valve is adjustable between the first configuration and the second configuration based at least in part on a crank position.

2. The baler of claim 1, wherein the connector length is adjustable between a first distance and a second distance different than the first distance.

3. The baler of claim 1, further comprising a pressure transducer in fluid communication with the fluid volume.

4. The baler of claim 3, further comprising a controller in operable communication with the pressure transducer, wherein the controller is configured to calculate the force being applied to the plunger based at least in part by a signal received from the pressure transducer.

5. The baler of claim 1, wherein the lockout valve is positioned in the first configuration over a first range of crank positions, and wherein the lockout valve is positioned in the second configuration over a second range of crank positions.

6. The baler of claim 1, wherein the lockout valve is adjustable between the first configuration and the second configuration based at least in part on a magnitude of force applied to the plunger.

7. The baler of claim 1, wherein the lockout valve is adjustable between the first configuration and the second configuration based at least in part on the position of the plunger with respect to the baling chamber.

8. The baler of claim 1, further comprising a controller in operable communication with the pump and the lockout valve, wherein the controller controls the output of the pump based at least in part on the configuration of the lockout valve.

9. The baler of claim 1, wherein the connector length is fixed in response to the lockout valve being in the second configuration.

10. A baler comprising:
    a frame;
    a feed system coupled to the frame;
    a baling chamber;
    a gearbox;
    a crank arm driven by the gearbox;
    a plunger at least partially positioned within and reciprocally movable with respect to the baling chamber;
    a connecting rod extending between and coupled to both the crank arm and the plunger, wherein the connecting rod defines a connector length, and wherein the connecting rod defines a fluid volume therein;
    a hydraulic system in fluid communication with the fluid volume, the hydraulic system having a hydraulic pump, and wherein the hydraulic system is adjustable between a first configuration, in which the hydraulic pump is fluidly isolated from the fluid volume of the connecting rod, and a second configuration, in which the hydraulic pump is in fluid communication with the fluid volume of the connecting rod, and
    wherein the hydraulic system is adjustable between the first configuration and the second configuration based at least in part on a level of force applied to the plunger.

11. The baler of claim 10, wherein the crank arm defines a crank position, and wherein the hydraulic system is adjustable between the first configuration and the second configuration based at least in part on the crank position.

12. The baler of claim 10, wherein the connector length of the connecting rod is adjustable.

13. The baler of claim 12, wherein the connector length is adjustable concurrently with the hydraulic system being in the second configuration.

14. The baler of claim 12, wherein the connector length is fixed concurrently with the hydraulic system being in the first configuration.

15. The baler of claim 9, wherein the hydraulic system is configured to adjust the connector length to produce a stroke profile, and wherein the stroke profile includes an extension stage, a locked stage, and a retraction stage.

16. The baler of claim 15, wherein the hydraulic system is in the first configuration during the locked stage, and wherein the hydraulic system is in the second configuration during the extension and retraction stages.

* * * * *